US009260974B2

(12) United States Patent
Hasting et al.

(10) Patent No.: US 9,260,974 B2
(45) Date of Patent: Feb. 16, 2016

(54) SYSTEM AND METHOD FOR ACTIVE CLEARANCE CONTROL

(71) Applicant: General Electric Company, Schenectady, NY (US)

(72) Inventors: William Howard Hasting, Cincinnati, OH (US); David William Crall, Loveland, OH (US); Craig William Higgins, Hamilton, OH (US); Erich Alois Krammer, West Chester, OH (US)

(73) Assignee: General Electric Company, Schenectady, NY (US)

( * ) Notice: Subject to any disclaimer, the term of this patent is extended or adjusted under 35 U.S.C. 154(b) by 944 days.

(21) Appl. No.: 13/625,924

(22) Filed: Sep. 25, 2012

(65) Prior Publication Data

US 2015/0252683 A1    Sep. 10, 2015

Related U.S. Application Data

(60) Provisional application No. 61/576,888, filed on Dec. 16, 2011.

(51) Int. Cl.
| | |
|---|---|
| *F02C 6/08* | (2006.01) |
| *F01D 11/24* | (2006.01) |
| *F01D 11/20* | (2006.01) |
| *F01D 25/24* | (2006.01) |

(52) U.S. Cl.
CPC ............... *F01D 11/24* (2013.01); *F01D 11/20* (2013.01); *F01D 25/24* (2013.01); *F02C 6/08* (2013.01); *F05D 2250/323* (2013.01); *F05D 2250/324* (2013.01)

(58) Field of Classification Search
CPC .............. F02C 7/18; F02C 6/08; F02C 7/185; F02C 9/18; F01D 11/20; F01D 11/24
See application file for complete search history.

(56) References Cited

U.S. PATENT DOCUMENTS

| | | | |
|---|---|---|---|
| 4,175,384 A | 11/1979 | Wagenknecht et al. | |
| 4,182,119 A | 1/1980 | Hurley | |
| 4,466,587 A | 8/1984 | Dusa et al. | |
| 4,493,184 A * | 1/1985 | Nikkanen et al. | ............... 60/204 |
| 4,525,998 A * | 7/1985 | Schwarz | ...................... 60/226.1 |
| 4,711,084 A | 12/1987 | Brockett | |
| 4,825,644 A | 5/1989 | Bubello et al. | |
| 4,830,315 A | 5/1989 | Presz, Jr. et al. | |

(Continued)

FOREIGN PATENT DOCUMENTS

| | | |
|---|---|---|
| EP | 0426500 | 5/1991 |
| EP | 0487242 | 5/1992 |

(Continued)

*Primary Examiner* — Gerald L Sung
(74) *Attorney, Agent, or Firm* — General Electric Company; William Scott Andes

(57) ABSTRACT

Active clearance control ejector systems and methods are disclosed. An example system may include an air ejector; an entrance pipe arranged to supply compressor bleed air to the air ejector; an inlet duct arranged to supply fan bypass air to the air ejector; and a supply pipe arranged to receive ejector outlet air from the air ejector and supply the ejector outlet air to an active clearance control system. The ejector outlet air may include a mixture of the compressor bleed air and the fan bypass air. The air ejector may include a venturi arranged to conduct the compressor bleed air therethrough, thereby drawing the fan bypass air into the air ejector.

17 Claims, 3 Drawing Sheets

(56) References Cited

U.S. PATENT DOCUMENTS

| | | |
|---|---|---|
| 5,114,103 A | 5/1992 | Coffinberry |
| 5,133,194 A | 7/1992 | Army, Jr. et al. |
| 5,209,633 A | 5/1993 | McGreehan et al. |
| 5,435,127 A | 7/1995 | Luffy et al. |
| 5,884,472 A | 3/1999 | Presz, Jr. et al. |
| 6,059,522 A * | 5/2000 | Gertz et al. .................. 415/1 |
| 6,360,528 B1 | 3/2002 | Brausch et al. |
| 6,412,270 B1 | 7/2002 | Mortzheim et al. |
| 7,174,704 B2 | 2/2007 | Renggli |
| 7,861,536 B2 | 1/2011 | Alecu et al. |
| 2003/0046938 A1* | 3/2003 | Mortzheim et al. ............ 60/782 |
| 2003/0205049 A1* | 11/2003 | Anderson et al. ............. 60/782 |
| 2006/0016171 A1 | 1/2006 | Renngli |
| 2008/0014078 A1 | 1/2008 | Suciu et al. |
| 2008/0202092 A1* | 8/2008 | Eluripati et al. ............ 60/39.83 |
| 2009/0314885 A1 | 12/2009 | Leland et al. |
| 2009/0317242 A1 | 12/2009 | Down et al. |
| 2010/0074736 A1 | 3/2010 | Junod |
| 2010/0162682 A1 | 7/2010 | Lerg |
| 2010/0170265 A1* | 7/2010 | Whaling et al. ................ 60/785 |
| 2012/0117977 A1* | 5/2012 | Childers et al. ............... 60/782 |

FOREIGN PATENT DOCUMENTS

| | | |
|---|---|---|
| EP | 0913567 | 5/1999 |
| EP | 0913568 | 6/1999 |
| EP | 1619376 | 1/2006 |
| EP | 2157305 | 2/2010 |
| WO | 03072923 | 9/2003 |
| WO | 2006110124 | 10/2006 |
| WO | 2010033706 | 3/2010 |
| WO | 2010074934 | 7/2010 |

* cited by examiner

SYSTEM AND METHOD FOR ACTIVE CLEARANCE CONTROL

CROSS REFERENCE TO RELATED APPLICATION

This application claims the benefit of U.S. Provisional Application No. 61/576,888, filed Dec. 16, 2011, which is incorporated by reference in its entirety.

BACKGROUND

The subject matter disclosed herein relates generally to active clearance control systems and, more specifically, to active clearance control systems that use compressor bleed air to pump fan bypass air for active clearance control using an air ejector, and associated methods.

Gas turbine engines feature several components, several of which define a core. With respect to the core, air enters the engine and passes through a compressor section which typically operates a set of compressor blades and stators arranged in stages. Each stage further compresses air that enters from an upstream stage. Some engine designs provide that the compressor stages are arranged with the initial stages being a low pressure compressor (LPC) and the remaining stages being a high pressure compressor (HPC). Upon being compressed as desired, the compressed air is routed through one or more combustors. Within a combustor are one or more nozzles that serve to introduce fuel into a stream of air passing through the combustor. Igniters are typically used to cause a resulting air-fuel mixture to burn within the combustor. The burned air-fuel mixture is routed out of the combustor through a turbine section to exert forces upon turbine blades thereby performing work. Some engine designs provide that the turbine stages are arranged with the initial stages being a high pressure turbine (HPT) and the remaining turbine stages being a low pressure turbine (LPT). In such designs, a system of axially concentric shafts is provided whereby the LPC is mechanically connected to the LPT and the HPC is mechanically linked to the HPT. For high-bypass turbofan engines, a bypass section has the largest blades that route some bypass air into the core, initially through the compressor, and remaining air outside the core, through a fan bypass duct, and alongside the engine where such bypass air rejoins the exhaust in the airstream downstream of an engine exhaust duct. The bypass section is often mechanically connected to the LPC. No matter the engine design selected, with the work extracted, the burned air-fuel mixture is routed out of the engine as exhaust.

In addition to the core and the components described above, aircraft turbine engines also utilize a cowl in order to route air in a desired manner. Active clearance control (hereinafter, ACC) has been utilized in order to provide impingement cooling of the casings under the cowl of the engine as a means to reduce blade tip clearances and achieve a positive effect on performance. Traditionally, an ACC system air inlet is located in a fan bypass duct, and an ACC exit vents to ambient pressure, such as that found outboard of the one or more nozzles within the core as described above. In other applications, such as, for example, marine or industrial turbines, ACC may be of even more importance and may be desired for operations at higher power settings than idle or partial power.

Some core components may be located in an axial position outside of the compressor, combustor, or turbine areas but inside a cowl outside of which bypass air flows. Such components are considered to be placed in an under cowl area. Core component cooling (hereinafter, CCC) refers to the routing of cold air along the outside of engine casings thereby keeping components within their design temperature limits. In addition, CCC can be utilized at low power settings or otherwise when there is not enough ambient air flowing through the cowl. For example, in aircraft applications, CCC has been found useful when the engine is being operated while the aircraft is on the ground running at idle or partial power. Once in flight, air flow is typically sufficient to cool the under cowl region.

The problems: For engines utilizing a long-duct-mixed-flow architecture, the fan bypass duct may extend past the core, and the inlet and outlet pressures may be approximately equal. Therefore, there may not be a large enough pressure difference available between inlet pressure and outlet pressure to drive desired ACC air flow. As a result, ACC system flow requirements may not be met. Further complicating such situations, direct HPC bleed may be too hot to provide desired cooling, and there may be insufficient space for direct LPC bleed tubing.

BRIEF DESCRIPTION

At least one solution for the above-mentioned problems is provided by the present disclosure to include example embodiments, provided for illustrative teaching and not meant to be limiting. Embodiments and alternatives provided herein for an ACC ejector system that increases the ACC system pressure differential to allow fan bypass air to meet ACC system flow requirements while limiting the amount of compressor bleed air required. Alternatives provide ejector outlet air of a temperature that is cool enough to serve as cooling air. Alternatives provide for the routing of fuel vapors out of, while providing cooling to, the under cowl region. For example, when an aircraft is on the ground at rest or nearly so, and the engines are at ground idle power settings, an air ejector can also be used to pump air through the cowl to cool components therein.

An example active clearance control ejector system for a gas turbine engine according to at least some aspects of the present disclosure may include an air ejector; an entrance pipe arranged to supply compressor bleed air to the ejector; an inlet duct arranged to supply fan bypass air to the air ejector; and/or a supply pipe arranged to receive ejector outlet air from the air ejector and supply the air ejector outlet air to an active clearance control system. The ejector outlet air may include a mixture of the compressor bleed air and the fan bypass air. The air ejector may include a venturi arranged to conduct the compressor bleed air therethrough, thereby drawing the fan bypass air into the air ejector.

An example method for active clearance control of a gas turbine engine according to at least some aspects of the present disclosure may include providing an active clearance control ejector system including an air ejector, an entrance pipe arranged to supply compressor bleed air to the air ejector, a control valve operatively disposed in the entrance pipe, the control valve allowing compressor bleed air to exit a compressor and pass through the entrance pipe and into the air ejector, an inlet duct arranged to supply fan bypass air to the air ejector, and a supply pipe arranged to receive ejector outlet air from the air ejector and supply the ejector outlet air to an active clearance control system, the ejector outlet air comprising a mixture of the compressor bleed air and the fan bypass air. The air ejector may include a venturi arranged to conduct the compressor bleed air therethrough, thereby drawing the fan bypass air into the air ejector. An example method may further include utilizing a FADEC to control a position of the control valve to vary an amount of the compressor bleed air flowing therethrough.

An example active clearance control system according to at least some aspects of the present disclosure may include a compressor bleed port arranged to deliver compressor bleed air from a compressor to an entrance pipe extending therefrom; a control valve operatively disposed in the entrance pipe, the control valve being arranged to selectively control flow of the compressor bleed air through the entrance pipe; a FADEC operatively coupled to the control valve to control a position of the control valve; an inlet duct arranged to flow fan bypass air therethrough; an air ejector comprising a venturi operatively coupled to the entrance pipe and the inlet duct such that flow of the compressor bleed air therethrough draws the fan bypass air from the inlet duct through the air ejector; and/or a supply pipe arranged to receive ejector outlet air from the air ejector and supply the ejector outlet air to a collector manifold, the ejector outlet air comprising a mixture of the compressor bleed air and the fan bypass air.

BRIEF DESCRIPTION OF THE DRAWINGS

The subject matter for which patent claim coverage is sought is particularly pointed out and claimed herein. The subject matter and embodiments thereof, however, may be best understood by reference to the following description taken in conjunction with the accompanying drawing figures in which:

DETAILED DESCRIPTION

Figure 1:
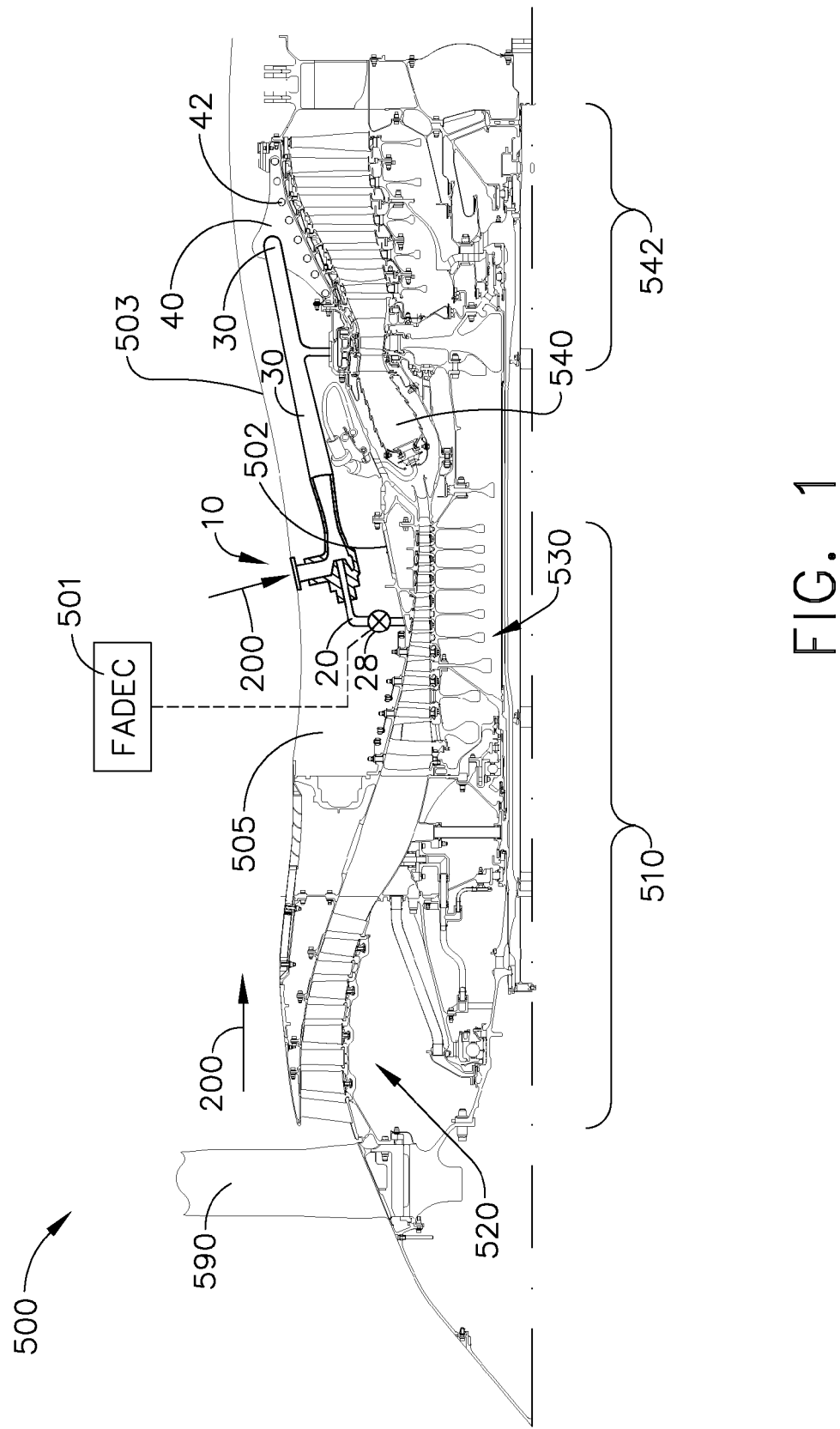
FIG. 1 is a partial cut-away view showing selected features of an example ACC ejector system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present disclosure includes, inter alia, active clearance control systems and, more specifically, active clearance control systems that use compressor bleed air to pump fan bypass air for active clearance control using an air ejector, and associated methods.

Figure 2:
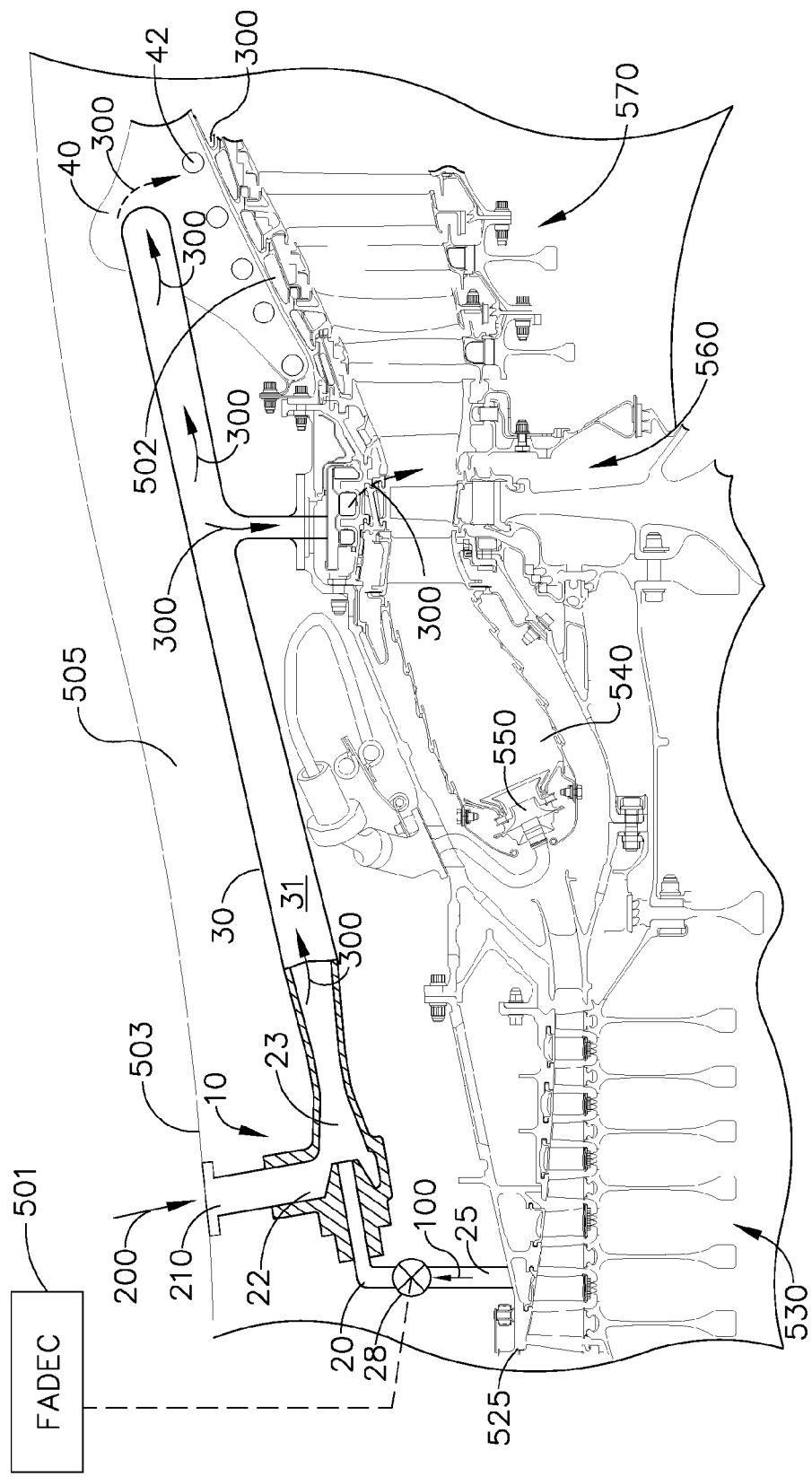
FIG. 2 is a partial cut-away view showing selected details of an example ACC ejector system.
Figure 3:
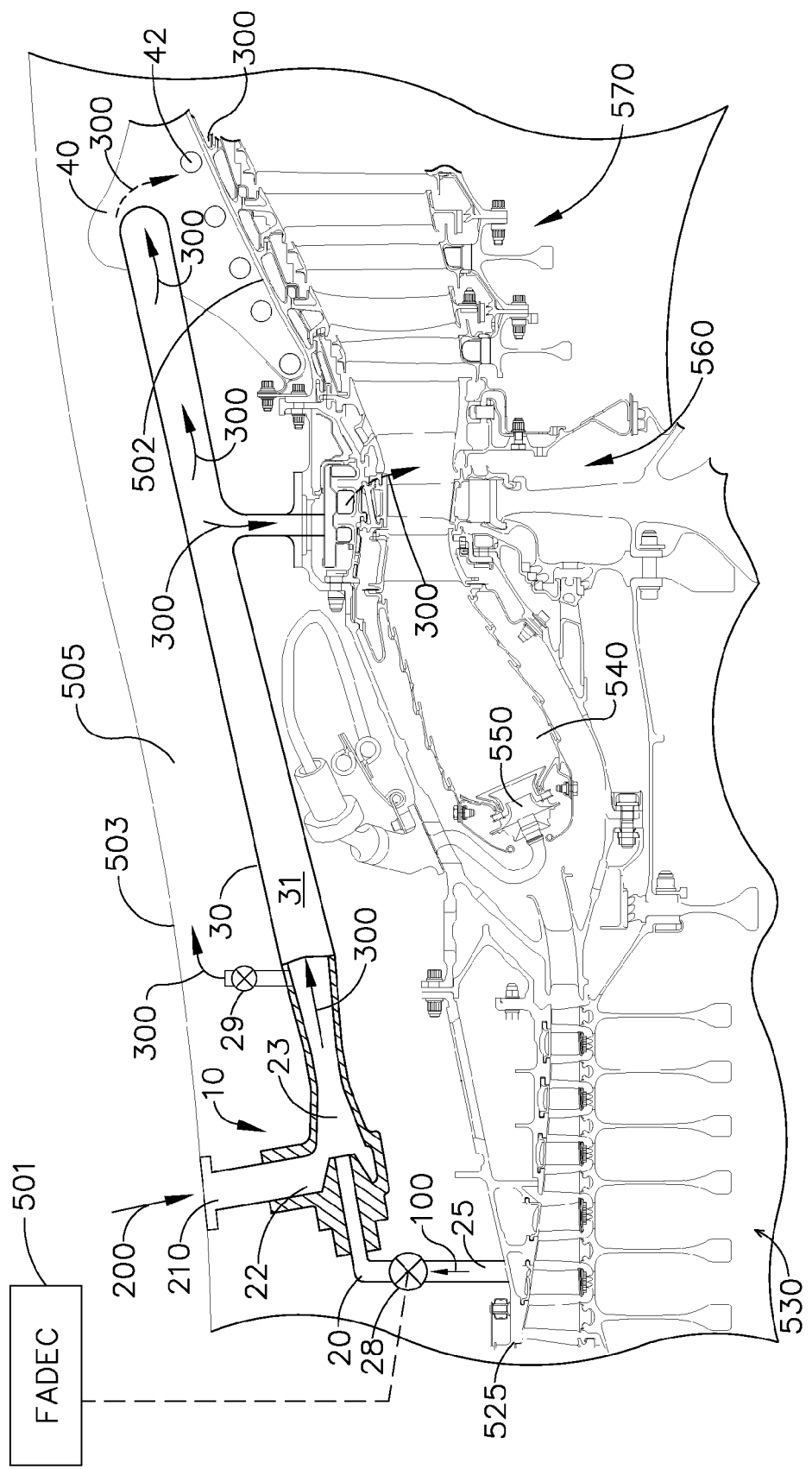
FIG. 3 is a partial cut-away view showing further selected details of an example ACC ejector system, all in accordance with at least some aspects of the present disclosure.

With reference to FIGS. 1-3, and with respect to the core, which may be disposed within a cowl 503, air enters the engine 500 and passes through a compressor section 510 which typically operates a set of compressor blades and stators arranged in stages. Each stage further compresses air that enters from an upstream stage. Compressor stages are arranged with the initial stages being a low pressure compressor (LPC) 520 and the remaining stages being a high pressure compressor (HPC) 530. Upon being compressed as desired, the compressed air is routed through one or more combustors 540. Within a combustor 540 are one or more nozzles 550 that serve to introduce fuel into a stream of air passing through the combustor 540. Igniters are typically disposed within the combustor 540 and used to cause a resulting air-fuel mixture to burn within the combustor 540. The burned air-fuel mixture is routed out of the combustor 540 through a turbine section 542 to exert forces upon turbine blades thereby performing work. The turbine section is arranged in turbine stages with the initial stages being a high pressure turbine (HPT) 560 and the remaining turbine stages being a low pressure turbine (LPT) 570. In such designs, a system of axially concentric shafts is provided whereby the LPC 520 is mechanically connected to the LPT 570 and the HPC 530 is mechanically linked to the LPT 570.

With particular reference to the details illustrated in FIGS. 2 and 3, an example active clearance control ejector system 10 may comprise one or more air ejectors 22 and an entrance pipe 25. Embodiments include those wherein a control valve 28 is disposed along the length of entrance pipe 25. In addition, as desired, an entrance elbow 20 may be provided to route fluid into the ejector 22. A supply pipe 30 may be affixed to the ejector 22. A portion of the supply pipe 30 downstream from and generally near the ejector may be formed to the shape of a venturi 23. An ACC chamber 31 may be located generally inside of pipe 30 and just downstream of venturi 23.

Compressor bleed air 100 is typically quite hot in temperature, this being certainly so when compared to the temperature of fan bypass air 200. This is all the more so when an aircraft is flying at altitude and the temperature of the fan bypass air 200 is approximately the same as the temperature of atmospheric air found at that altitude. Embodiments are provided wherein a blend of compressor bleed air 100 with fan bypass air 200 results in ejector outlet air 300, the ejector outlet air being cooler in temperature than the compressor bleed air 100.

In further detail, a high pressure motive fluid in the form of compressor bleed air 100 exits the compressor section 510 by passing through a compressor bleed port 525 formed in compressor section 510 and passing further through the entrance pipe 25 and on into the control valve 28 in a manner as desired and controlled by an engine FADEC 501. Having passed through the control valve 28 and elbow 20 (as desired), the compressor bleed air 100 enters the ejector 22 and passes through the venturi 23 thereby entering the ACC chamber 31. Outside air having passed through the bypass fan 590 (FIG. 1) becomes fan bypass air 200 which is allowed to enter the ejector 22 by passing through an inlet duct 210 formed and disposed in the engine 500 to place the ejector 22 into fluid communication with the fan bypass air 200. The compressor bleed air 100 passing through venturi 23 and entering the ACC chamber 31 causes a low pressure area to exist within the ejector 22 and with further respect to the pressure seen by fan bypass air 200 outside of the ejector 20. As a result, the effect of the venturi 23 is that of a pump to draw what is, in effect, low pressure inlet fluid in the form of fan bypass air 200 through the inlet duct 210 where the fan bypass air 200 is allowed to mix freely with compressor bleed air 100, the resulting air stream becoming ejector outlet air 300 which is routed further downstream in the system to become such that ejector outlet air 300 enters the supply pipe 30 and on to enter a collector manifold 40 having one or more impingement rings 42 affixed as desired and disposed around the casing 502 of the engine 500 as desired in order to provide cooling of the casing 502 as desired and in order to control the size of the casing 502 and thereby control blade tip clearances.

With reference to the figures, by taking advantage of the venturi 23 (shown in detail in FIGS. 2 and 3) disposed within the air ejector 22, the system 10 increases the pressure differential in the ACC flow path, allowing the fan bypass air 200 to be drawn in to the system 10 and become resulting ejector outlet air 300 that is cold enough in temperature to serve as cooling air and thereby meet the ACC system 10 flow requirements while minimizing the amount of compressor bleed 100 required. Additionally, with regard to embodiments of the system 10, such a reduction in the amount of compressor bleed air 100 needed is especially useful in circumstances such as ground idle and taxi where otherwise warmer air surrounding the engine would be drawn into existing aircraft climate systems and require more work from those systems in controlling temperatures within a cabin of the aircraft.

With reference to FIG. 3, alternative embodiments provide a relief valve 29 disposed upon supply pipe 30 and just downstream of venturi 23. Such alternatives allow for the selective routing, as desired, of fluid to include fuel vapors out the under cowl region 505 while providing cooling to the under cowl region 505. For example, at least some ejector outlet air 300 may be directed to an under cowl region 505 via relief valve 29, when desired. These alternatives are used in conditions such as, for example not meant to be limiting, when an aircraft is on the ground at rest or possibly moving at slow taxi speeds, when the engines are at or near flight idle power settings. In such cases, the system 10, by virtue of the relief valve 29, is able to pump air through the under cowl region 505 to cool components.

An example method for active clearance control may comprise the following operations:

1) Providing an ACC system 10 comprising one or more air ejectors 20, each of the one or more ejectors 20 further comprising a venturi 23, an ACC chamber 31, and an entrance pipe 25, and a supply pipe 30 being affixed to the ejector 22.

2) Utilizing a FADEC 501 in order to measure core temperatures as desired and utilize such measurements to adjust a position of the control valve 28.

3) The control valve 28 setting configurable to be at a minimum setting for takeoff; a medium setting for climb out, flight at partial power and descent; and a maximum setting for flight at cruise altitude.

Another example method may include the following operations:

providing an active clearance control ejector system comprising
an air ejector,
an entrance pipe arranged to supply compressor bleed air to the ejector,
a control valve operatively disposed in the entrance pipe, the control valve allowing compressor bleed air to exit a compressor and pass through the entrance pipe and into the air ejector,
an inlet duct arranged to supply fan bypass air to the ejector, and
a supply pipe arranged to receive ejector outlet air from the air ejector and supply the ejector outlet air to an active clearance control system, the ejector outlet air comprising a mixture of the compressor bleed air and the fan bypass air,
wherein the air ejector comprises a venturi arranged to conduct the compressor bleed air therethrough, thereby drawing the fan bypass air into the air ejector; and/or
utilizing a FADEC to control a position of the control valve to vary an amount of the compressor bleed air flowing therethrough.

For embodiments having a relief valve 29, the FADEC 501 adjusts the position of the relief valve 29 as desired. The relief valve 29 may be adjustable to allow for core component cooling at or near flight idle power settings and at aircraft speeds at or near zero while on the ground.

With reference to the figures, some core components such as, for example, the air ejector 10, the supply pipe 30, and manifold 42 are located in an axial position outside of the compressor, combustor or turbine areas but inside a cowl outside of which, for example shown in the figures, bypass air 200 flows.

While specific embodiments have been described, it will be apparent to those skilled in the art that various modifications thereto can be made without departing from the spirit and scope of the invention as defined in the appended claims. This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An active clearance control ejector system for a gas turbine engine, the active clearance control ejector system comprising:
    an air ejector;
    an entrance pipe arranged to supply compressor bleed air to the air ejector;
    an inlet duct arranged to supply fan bypass air to the air ejector; and
    a supply pipe arranged to receive ejector outlet air from the air ejector and supply the ejector outlet air to an active clearance control system, the ejector outlet air comprising a mixture of the compressor bleed air and the fan bypass air; and
    a relief valve disposed upon the supply pipe and arranged to discharge ejector outlet air to an under cowl region;
    wherein the air ejector comprises a venturi arranged to conduct the compressor bleed air therethrough, thereby drawing the fan bypass air into the air ejector.

2. The active clearance control ejector system of claim 1, further comprising
    a compressor bleed port formed in a core of the engine and arranged to deliver the compressor bleed air to the entrance pipe;
    a control valve operatively disposed in the entrance pipe, the control valve allowing compressor bleed air to exit a compressor section and pass through the entrance pipe and into the air ejector.

3. The active clearance control ejector system of claim 2, further comprising a controller operatively arranged to control a position of the control valve in the entrance pipe.

4. The active clearance control ejector system of claim 3, wherein the controller comprises a FADEC.

5. The active clearance control ejector system of claim 1, further comprising a collector manifold operatively coupled to the supply pipe to receive ejector outlet air therefrom.

6. The active clearance control ejector system of claim 5, wherein the collector manifold comprises one or more impingement rings affixed upon and disposed around a casing of the engine in order to provide cooling of the casing thereby allowing control of the size of the casing and thereby controlling blade tip clearances.

7. The active clearance control ejector system of claim 1, further comprising a controller operatively arranged to control a position of the relief valve.

8. The active clearance control ejector system of claim 7, wherein the controller comprises a FADEC.

9. A method for active clearance control of a gas turbine engine, the method comprising:
providing an active clearance control ejector system comprising
an air ejector,
an entrance pipe arranged to supply compressor bleed air to the air ejector,
a control valve operatively disposed in the entrance pipe, the control valve allowing compressor bleed air to exit a compressor and pass through the entrance pipe and into the air ejector,
an inlet duct arranged to supply fan bypass air to the air ejector, and
a supply pipe arranged to receive ejector outlet air from the air ejector and supply the ejector outlet air to an active clearance control system, the ejector outlet air comprising a mixture of the compressor bleed air and the fan bypass air, and
a relief valve arranged to selectively discharge at least a portion of the ejector outlet air to an under cowl region;
wherein the air ejector comprises a venturi arranged to conduct the compressor bleed air therethrough, thereby drawing the fan bypass air into the air ejector; and
utilizing a FADEC to control a position of the control valve to vary an amount of the compressor bleed air flowing therethrough.

10. The method of claim 9, wherein the gas turbine engine is associated with an aircraft and wherein the FADEC is configured to position the control valve at a relatively low flow setting for takeoff; a medium flow setting for climb out, flight at partial power, and descent; and a relatively high flow setting for flight at cruise altitude.

11. The method of claim 9, wherein utilizing the FADEC to control a position of the control valve to vary an amount of the compressor bleed air flowing therethrough comprises receiving, by the FADEC, at least one temperature parameter and adjusting the position of the control valve based at least in part upon the at least one temperature parameter.

12. The method of claim 9, further comprising controlling a position of the relief valve using the FADEC.

13. The method of claim 12, wherein controlling the position of the relief valve using the FADEC comprises at least partially opening the relief valve to provide core component cooling at or near flight idle power settings and at aircraft speeds at or near zero while on the ground.

14. An active clearance control system for a gas turbine engine, the active clearance control system comprising:
a compressor bleed port arranged to deliver compressor bleed air from a compressor to an entrance pipe extending therefrom;
a control valve operatively disposed in the entrance pipe, the control valve being arranged to selectively control flow of the compressor bleed air through the entrance pipe;
a FADEC operatively coupled to the control valve to control a position of the control valve;
an inlet duct arranged to flow fan bypass air therethrough;
an air ejector comprising a venturi operatively coupled to the entrance pipe and the inlet duct such that flow of the compressor bleed air therethrough draws the fan bypass air from the inlet duct through the air ejector; and
a supply pipe arranged to receive ejector outlet air from the air ejector and supply the ejector outlet air to a collector manifold, the ejector outlet air comprising a mixture of the compressor bleed air and the fan bypass air; and
a relief valve operatively coupled to the supply pipe and arranged to selectively discharge at least a portion of the ejector outlet air to an under cowl region of the gas turbine engine.

15. The active clearance control system of claim 14, wherein the collector manifold comprises one or more impingement rings affixed upon and disposed around a casing of the engine in order to provide cooling of the casing thereby allowing control of the size of the casing and thereby controlling blade tip clearances.

16. The active clearance control system of claim 14,
wherein the gas turbine engine is associated with an aircraft, and
wherein the FADEC is configured to position the control valve at a relatively low flow setting for takeoff; a medium flow setting for climb out, flight at partial power, and descent; and a relatively high flow setting for flight at cruise altitude.

17. The active clearance control system of claim 14, wherein the FADEC is configured to control a position of the relief valve.

* * * * *